June 24, 1958 R. J. ANDERSON 2,840,269
SUGAR CANE PLANTER
Filed Sept. 14, 1953 5 Sheets-Sheet 2
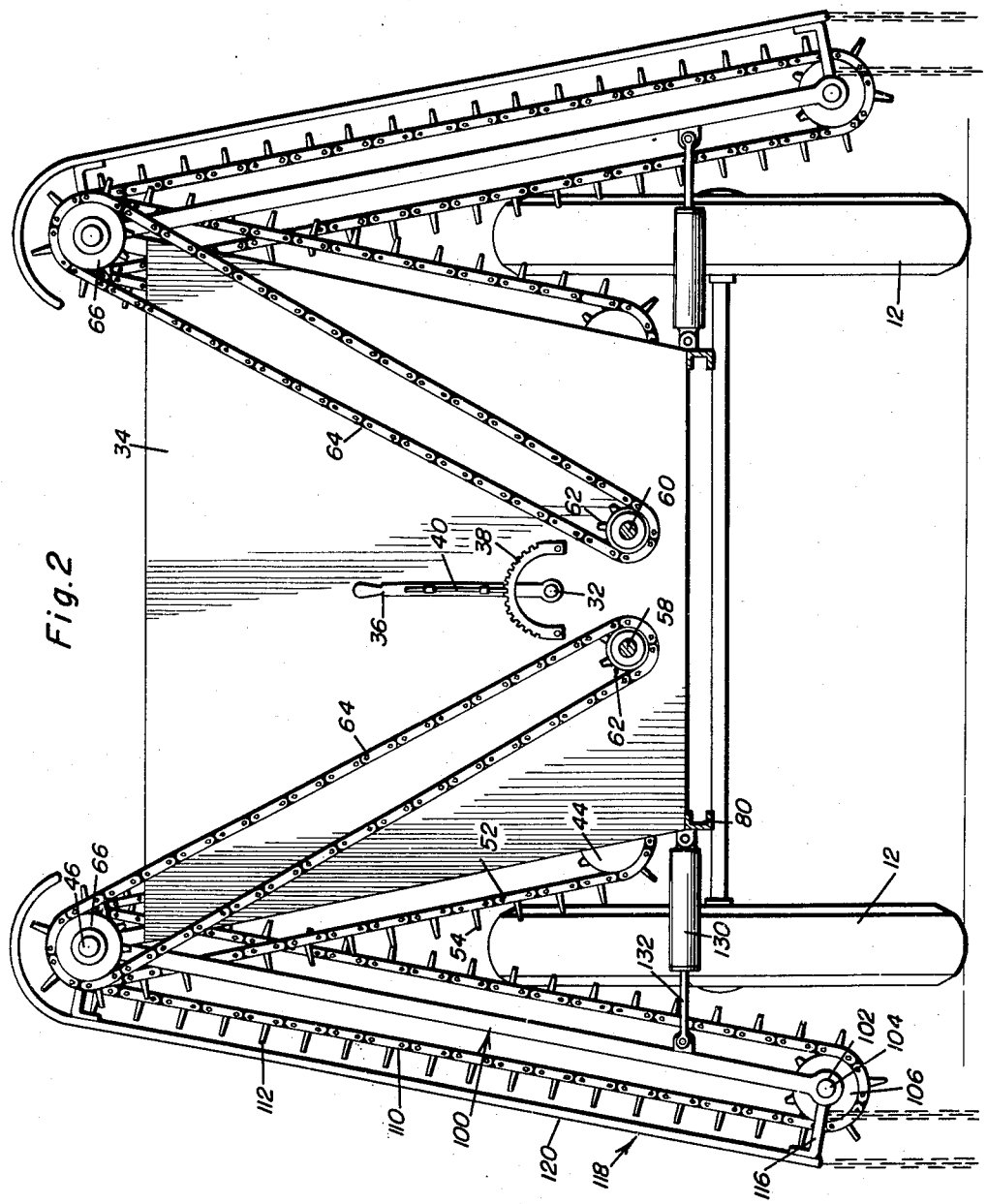
Robert J. Anderson
INVENTOR.

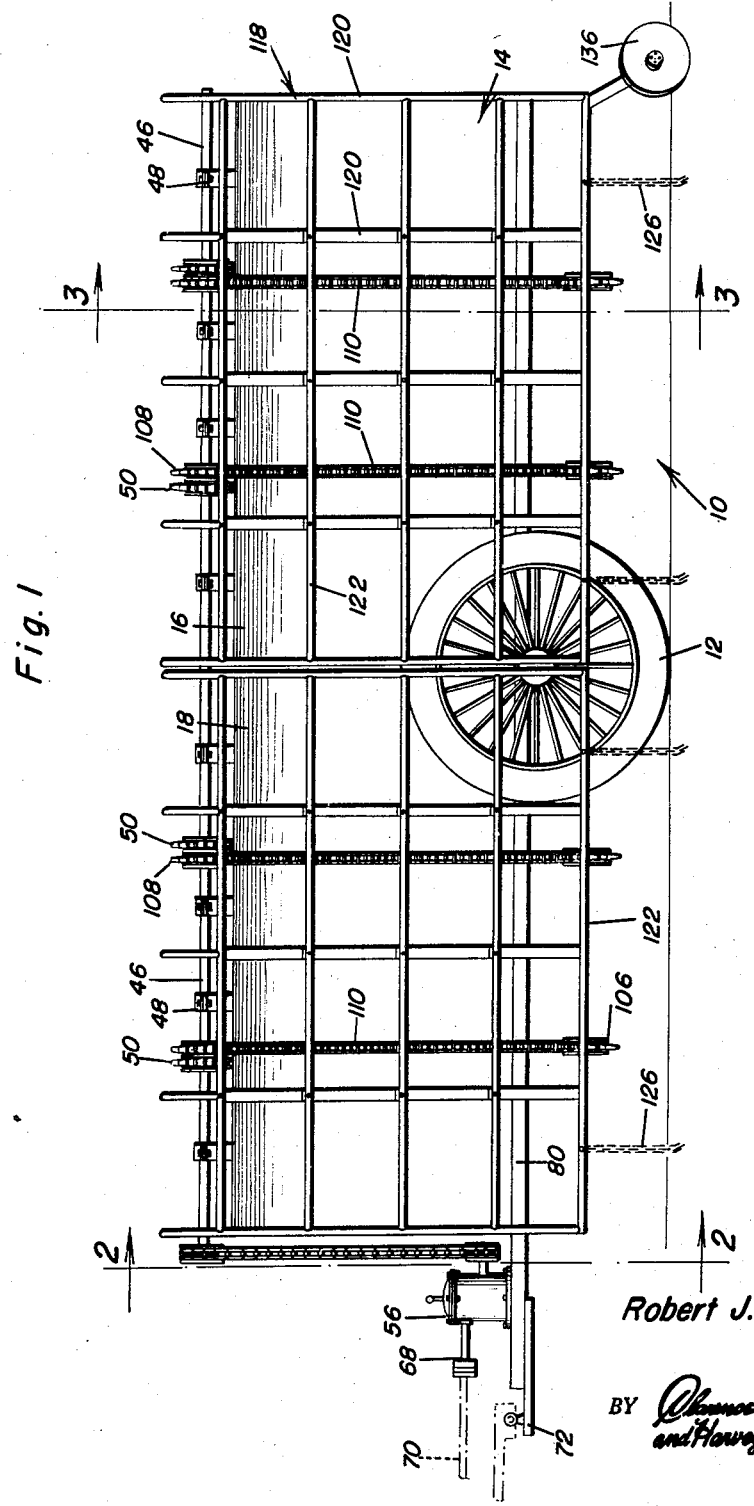

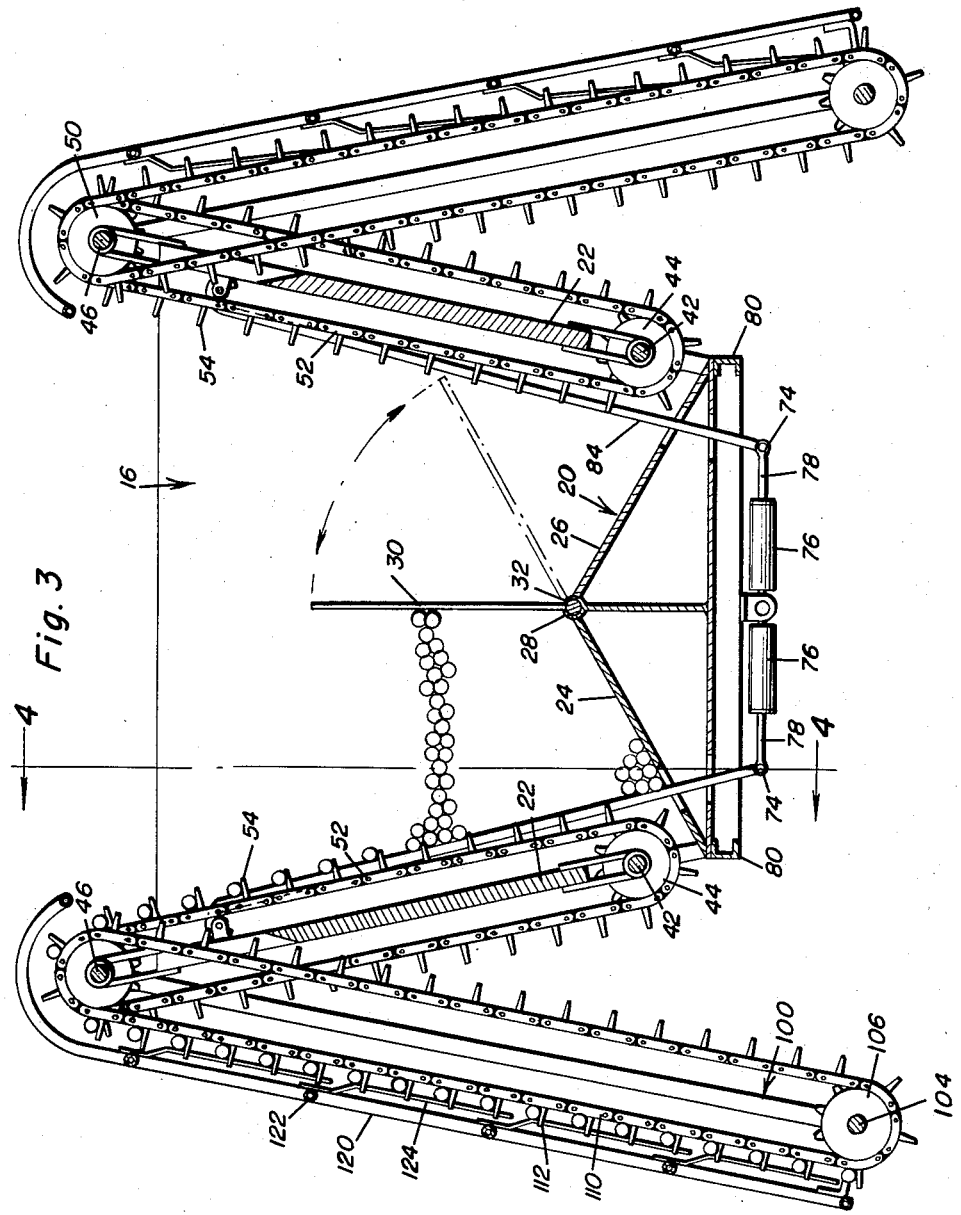

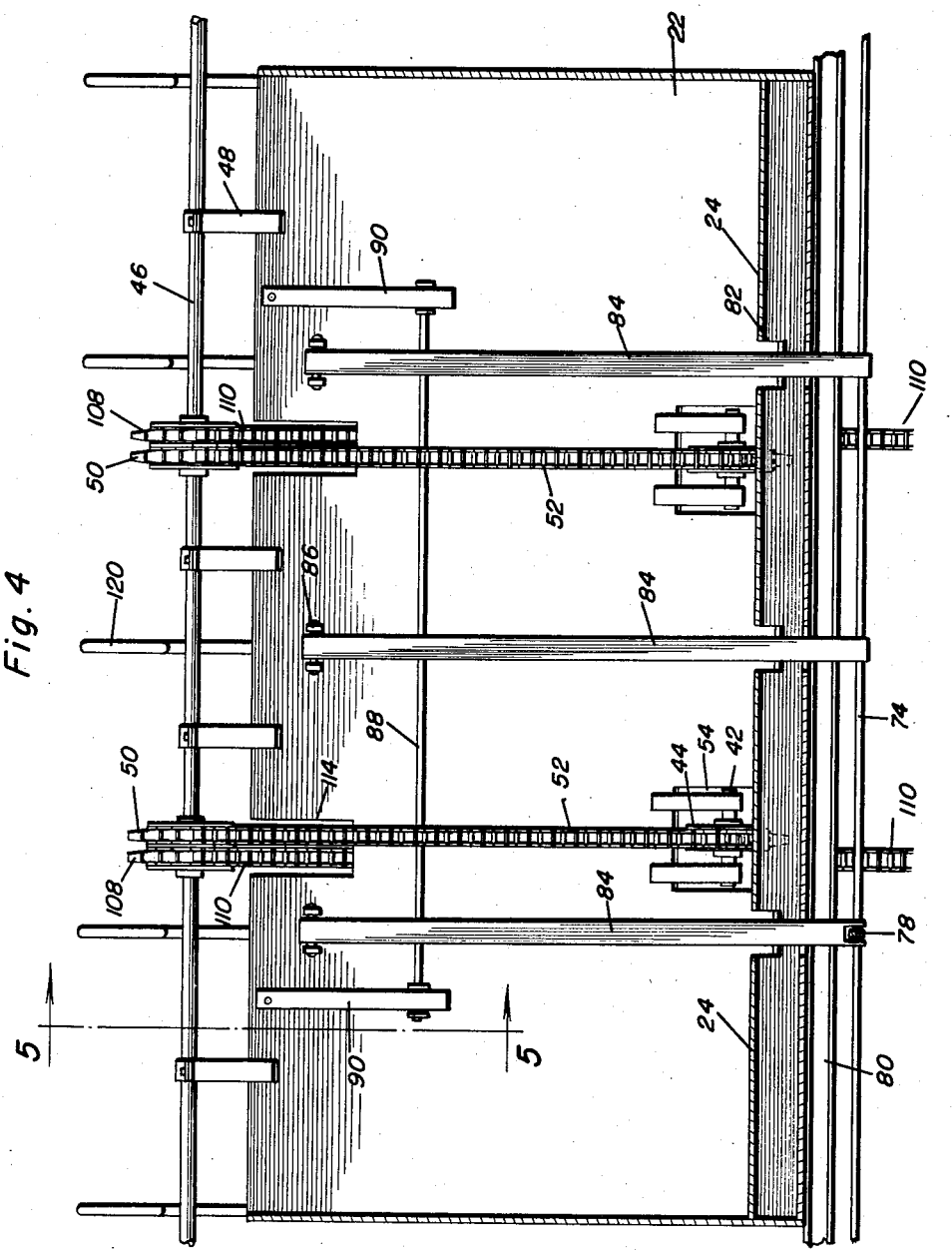

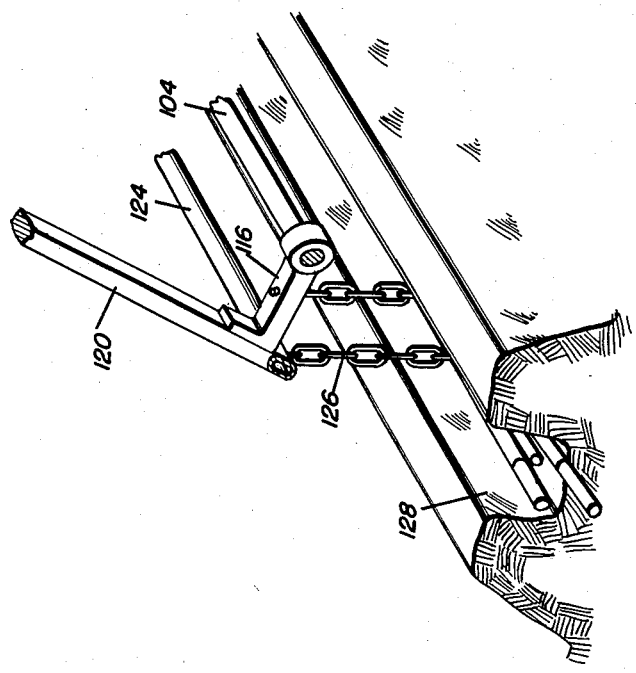
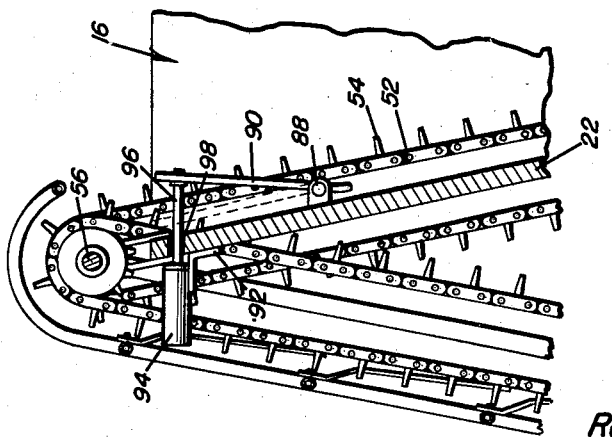
Robert J. Anderson
INVENTOR.

United States Patent Office 2,840,269
Patented June 24, 1958

2,840,269
SUGAR CANE PLANTER
Robert J. Anderson, Labadieville, La.
Application September 14, 1953, Serial No. 379,825
4 Claims. (Cl. 221—185)

The present invention relates to planting machines and more particularly relates to a sugar cane planter.

The primary object of the invention is to provide a sugar cane planter comprising a wheeled vehicle for carrying the cane stalks having means thereon for automatically lifting the cane stalks from the vehicle and consecutively depositing them in correct position in a previously prepared furrow as the vehicle is moved along the furrow.

In accordance with the invention, the planter is provided with the means for progressively lifting the cane stalks from the vehicle, from the top of the pile of cane stalks in the vehicle, as the height of the pile diminishes.

Another object of the invention is to provide a transfer table receiving the cane stalks from the lift means and guiding them toward the furrow that may be moved to overlie the furrow when the vehicle is at varying distances from the furrow.

Yet another object of the invention is to provide flexible guide elements depending into the furrow for properly guiding the cane stalks into horizontal positions extending longitudinally of the furrow.

Another object of the invention is to provide a sugar cane planter including means for covering over the cane stalks which have been placed in the furrow by the planter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a sugar cane planter constructed in accordance with the present invention;

Figure 2 is a cross sectional view of the planter taken substantially along section line 2—2 of Figure 1;

Figure 3 is a cross sectional view of the planter taken substantially along section line 3—3 of Figure 1, disclosing the interior details of the wheeled vehicle;

Figure 4 is an enlarged view of the inner side wall surface of a compartment of the vehicle showing the lifting and progressive selecting means of the planter;

Figure 5 is an enlarged cross sectional view taken substantially along section line 5—5 of Figure 4 showing the constructional details of a movable scraping means for removing cane stalks from the lifting means when desired; and Figure 6 is an enlarged detail view of a portion of the transfer table including a flexible guide element for guiding the cane stalks into proper position.

Referring now to the drawings in detail, the sugar cane planter is designated in its entirety by the numeral 10 and consists essentially of a wheeled vehicle in the form of a wagon, or the like, having wheels 12 supporting a bed 14, the bed 14 in the embodiment shown being divided into two compartments 16, and 18, respectively.

As will be noted particularly in Figure 3, each compartment is in the form of an elongated bin, having a bottom 20 and upwardly diverging side walls 22. The bottom 20 is in the shape of an inverted V having floor portions 24 and 26 diverging from the apex 28 to the lower edges of the side walls 22. Swingably mounted at the apex 28 of the bottom 20 is an upwardly extending partition 30. The partition 30 is mounted on shaft 32 extending through the passage formed in the apex 28 of the bottom 20.

The shaft 32 extends through the forward end wall 34 of the bed 14 and has an operating lever 36 securely fixed at one end thereto. A toothed quadrant 38 is secured to the front end wall 34 adjacent the terminal of the shaft 32 to lock the lever 36 in selected position by means of the rod 40 on the lever 36 extending between a selected pair of teeth on the quadrant 38. Thus, the longitudinal, swinging partition 30 may be swung toward either of the side walls 22 of the bed 14 and held in any selected position. Obviously, other means than the shaft and lever linkage could be utilized to swing the partition 30, this means being shown for purposes of illustration only.

Extending longitudinally of the bed 14 through the side walls thereof, adjacent the lower edges of the side walls 22 are shafts 42. Sprockets 44 are mounted at selected intervals on the shafts 42. Shafts 46 are mounted on suitable pillow blocks 48 above the upper edges of the side walls 22 and extend longitudinally throughout the length of the bed 14. At selected intervals, sprockets 50 are mounted on the shafts 46 in alignment with the sprockets 44. Conveyor means in the form of endless chains 52 are entrained over each set of aligned sprockets 44 and 50.

In the illustrated embodiment, each of the compartments 16 and 18 is shown having two of the endless chain conveyors 52 extending substantially from the lower edge of the side wall 22 to the upper edge of this side wall and straddling the outer and inner surfaces thereof. As will be noted in Figure 4, the side walls 22 are notched adjacent their lower edges as at 54 for the reception of the shafts 42 upon which the sprockets 44 are mounted. Each chain 52 is provided at longitudinally spaced intervals with perpendicularly projecting pick-up fingers 54 for grasping the cane stalks within the compartment and lifting them therefrom as the inner run of each conveyor chain is driven upwardly.

To drive the lifting means, consisting of each set of endless chains 52, for extracting the cane stalks from the compartments 16 and 18, a transmission housing 56 of known design is mounted at the front of the vehicle for driving oppositely rotating shafts 58 and 60 projecting rearwardly therefrom. Sprockets 62 are mounted on the shafts 58 and 60 and chains 64 lead from these sprockets to driven sprockets 66 mounted on the shafts 46. As shown in Figure 1, shaft 68 leads from the transmission 56 and is connected to the power take-off shaft 70 shown in dotted outline from a tractor, or the like, utilized to draw the planter 10 and hitch to the forward end thereof, as at 72. With this arrangement, as the shafts 46 are driven, so will the lifting conveyor means 52 be driven, so that the pick-up fingers 54 will lift the longitudinally arranged cane stalks from the compartments 16 and 18 over the upper edge of the side walls 22 of these compartments. Extending longitudinally underneath the bed 14 below the lower edge of each of the side walls 22 is a rod 74. To mount the rods 74, hydraulic rams 76 are mounted beneath the frame in back-to-back relation to one another so that their pistons 78 are movable toward and away from the side edges of the bed 14, as is evident from the relation to the side frame members 80 of the vehicle frame, as shown in Figure 3. Each of the rod 74 is journaled in the free ends of the pistons 78 disposed along the frame. Rams 76 may, of course, be actuated from the hydraulic system of a tractor, or the like, to move the rods 74 toward and away from the side frame members 80. The slanting floor or bottom sections 24 and 26, respectively, have openings 82 therethrough at longitudinally spaced intervals, and upwardly extending rub boards 84 mounted at their lower ends on the rods 74 project upwardly through these openings and are secured at their upper ends as at 86 to the inner surfaces of the side walls 22. By moving the rods 74 toward and away from the side edges of the bed 14, the rub boards 84 are likewise moved and pivoted about their upper ends 86 to move toward and away from the inner surface of the side walls 22. When the pistons 78 are retracted to their full position, the lower ends of the rub boards 84 are moved toward the center line of the bed 14 and the major portions of the rub boards 84 disposed within the compartment 16 or 18 projects beyond the length of the pick-up fingers 54 to prevent these fingers from picking up any of the cane stalks. Although the upper ends of the rub boards 84 are shown as being only pivotally mounted on the inner surfaces of the side walls 22, they may be also movable toward and away from the inner surface of the side walls in the same manner as the lower ends thereof. In localities wherein mechanization is only primitive, the hydraulic rams 76 could be replaced by any suitable leverage, wedge action, or screw to move the rods 74. The same would apply to moving the upper ends 86 of the rub boards 84 toward and away from the side walls 22.

With this arrangement, by controlling the positioning of the rods 74, the rub boards 84 will progressively allow the teeth 54 to pick up only the cane stalks from the top of the pile within each compartment as the pile diminishes from the compartment. Thereby, in effect, the rub boards 82 in each compartment serve as a selector means for selectively maintaining all but the uppermost layers of cane stalks out of engagement with the conveyors 52.

Intermediate its upper and lower edges, the inner surface of each side wall 22 is provided with a longitudinally extending rod 88. Scraping boards 90 are pivotally secured at their lower ends to the rod 88 adjacent the lifting conveyors 52. The rod 88 and the lower ends of the scraping boards 90 are disposed behind the inner runs of the conveyor chains 52 in order not to interfere with the pick-up fingers 54.

Mounted on suitable brackets 92 secured to the outer surface of each side wall 22 are hydraulic rams 94 having their pistons 96 projecting through apertures 98 in the side wall and secured to the upper ends of the boards 90. Upon actuation of the pistons 96, the upper ends of the boards 90 are moved outwardly beyond the free ends of the pick-up teeth 54 to scrape off cane stalks when the same are not desired to be lifted from the compartment.

The rams 94 are so arranged that the rub boards 90 along one side of the bed 14 are operated simultaneously and may be operated from the hydraulic system of a tractor or the like.

Pivotally suspended from each of the shafts 46 and depending exteriorly of the side walls 22 of the bed 14 is a transfer table in the form of a rectangular frame 100 (see Figure 2).

Each frame 100 is composed of a plurality of downwardly depending bars having aligned eyes 102 formed in the lower ends thereof through which a shaft 104 is journaled. Sprockets 106 are mounted on the shaft 104 at longitudinally spaced intervals therealong. Shaft 46 along the upper edge of each side wall 22 has sprockets 108 thereon, each sprocket 108 being adjacent a sprocket 50 from a lifting conveyor. Endless chains 110 are entrained over the sprockets 108 and 106 so that for each upwardly moving conveyor 52 there is a downwardly moving conveyor 110. Each pair of conveyors 110, for each compartment of the bed 14 along with its associated portion of the rectangular frame 100 forms a transfer table for receiving cane stalks from the lifting means. Since the conveyors 52 and 110 are both driven from the common shaft 46, on each side of the bed 14, they will be driven at substantially the same speed and the outer run of each chain 110 will move downwardly toward the ground. Transfer teeth 112 project from each chain 110 at longitudinally spaced intervals therealong, the spacing being equal to that of the lifting conveyor chains 52 so that as the chains 110 and 52 pass over the sprockets 50 and 108, the transfer fingers 112 and the pick-up fingers 54 will be parallel to one another. Thus, when the pick-up fingers 54 release the stalks, as the downward run of each conveyor chain 52 begins, the downward run of each conveyor chain 110 will pick up the stalks so released on the transfer teeth 112.

To provide free movement for the downward run of the chain 52 and the upward run of the chain 110, at each point along each side wall 22, the side wall is notched at its upper edge as at 114.

Secured to the table 100 and spaced outwardly therefrom by means of suitable brackets 116 is a skeleton frame 118 comprised of a plurality of upwardly extending members 120 spaced at longitudinal intervals along the length of the bed 14 and connected and maintained in their spaced relationship by vertically spaced cross members 122 extending therebetween. The skeleton frame is spaced outwardly from the transfer table 100, a distance sufficient to retain the outer or downward run of the transfer conveyor means formed by the conveyors 110 within the space formed between the skeleton frame 118 and the transfer table 100. Suitable spring fingers or other resilient means 124 extend inwardly from the inner surface of each longitudinal member 120 of the skeleton frame 118 and then project downwardly substantially parallel to the outer run of the conveyor chains 110. Thus, as the cane stalks are transferred to the transfer conveyors 110 and thence move downwardly toward the ground, the spring fingers 124 retain the stalks on the transfer fingers 112 until they are dropped from the conveyor into the furrow.

Suspended from the lowermost brackets 116 securing the skeleton frame 120 to the shaft 104 of the table 100 are flexible elements 126 in the form of chains which guide the cane stalks after their release from the transfer conveyors 110 into the previously prepared furrow 128. This construction is most clearly shown in Figure 6.

Suitable hydraulic rams 130 secured at their rear ends to the side frame members 80 have their plungers 132 connected to the transfer table 100 so that outward movement of the plungers 132 swing the table 100 outwardly from the side of the bed 14 so that the table may be utilized at varying distances from the furrow.

In the operation of the device, the compartments 16 and 18 are first filled with cane stalks cut to the desired length and piled longitudinally within the compartments. The slanting bottom 20 of each compartment directs the cane stalks toward the side walls 22 of each compartment and helps retain them in longitudinally aligned relation with one another. The rub boards 84 are then moved out at their lower ends through actuation of the hydraulic rams 76 and pivoted about their upper ends 86 to the position wherein only the topmost layers of cane stalks will be engaged by the pick-up teeth 54 on the lifting conveyors 52. As the cane stalks are lifted one by one on the pick-up teeth 54 and transferred to the transfer tables 100, the ram plungers 78 are extended from the rams 76 to slowly permit the engagement of the pick-up teeth 54 at a lower point within the compartment to allow for the diminishing height of the cane stalk pile. The transfer conveyors 100 conduct the cane stalks downwardly and drop them off consecutively into the prepared furrow 128 so that they fall horizontally and longitudinally at spaced intervals in the furrow. Guide elements 126 actually depend into the furrow and prevent the inadvertent passage of a cane stalk to a position other than in the furrow.

When it is desired to deposit cane stalks into a furrow on only one side of the planter, only one shaft 46 need be driven and in the event the drive mechanism is such that both must be driven at the same time, the rub boards 84 on one side may be pulled out a sufficient distance so that the pick-up teeth on the unused side of the conveyor will not pick up the cane stalks from the compartment. Thus, the swinging partition 30 may be swung to the dotted line position shown in Figure 3 to direct the cane stalks against only one wall 22 of the compartment.

When it is desired for any reason to leave an interval of extended length in the furrow, the scraping boards 90 may be pressed outwardly by the plungers 96 from the rams 94 to knock the cane stalks off the pick-up teeth 54. When the portion of the furrow not to be planted is passed, the plungers 96 are retracted and the pick-up fingers 54 again allowed to carry cane stalks to the transfer table 100.

Secured to the rear end of the planter at opposite sides thereof from brackets are sets of angularly related rolling coulters 136 which cover over the furrows after the deposition of cane stalks therein.

Although as shown in the preferred embodiment, the wagon is formed with two compartments, it is quite clear that it may be as easily formed of one compartment and that any number of conveyors, both on the lifting means and the transfer table can be utilized for each compartment depending primarily on the sizes of the cane stalks to be planted. Also the power for driving the conveyors could be taken directly from the wheels 12 of the planter 10 and need not be taken from a separate source. Likewise, wherein hydraulic rams have been specified in the preferred embodiment, the movement of the parts could be as readily effected with suitable leverages and leverage linkages needing no exterior source of power.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A sugar cane planter comprising a wheeled vehicle having a bed thereon for carrying sugar cane stalks longitudinally therein, upwardly extending side walls on said bed and a bottom slanted toward at least one of said side walls for directing cane stalks piled longitudinally within the bed toward the one side wall, lifting means on said vehicle including endless conveyor means having upwardly moving inner runs disposed adjacent the inner surface of said one side wall and extending from adjacent the bottom edge of the side wall toward the upper edge of the wall for lifting cane stalks over the upper edge thereof, a transfer table including downwardly moving conveyor means on said vehicle and depending exteriorly of said one side wall from the upper edge thereof for receiving cane stalks from said lifting means and depositing them in a furrow, drive means for said conveyor means connected to said vehicle, selector means movably mounted within said bed adjacent said one side wall in partially overlapping upwardly converging relation to the inner run of said endless conveyor for selectively maintaining all but the uppermost layers of cane stalks out of engagement with said inner runs of said endless conveyors.

2. A sugar cane planter comprising a wheeled vehicle having a bed thereon including side walls and a bottom for carrying cane stalks longitudinally therein, elevating means in said bed for lifting cane stalks over the top of at least one side wall, said elevating means including at least two endless conveyors extending from the bottom to the top of said one side wall and being disposed at longitudinally spaced intervals along said one side wall, said conveyors each having at least one inner run thereof disposed within said bed adjacent said one side wall, cane engaging fingers on said conveyors, means disposed along said one side wall within said bed for selectively spacing cane from the inner runs of the conveyors, said cane spacing means being swingably attached to said one side wall adjacent the upper end thereof and extending toward the bottom of the bed, for inward swinging movement into the bed beyond the inner runs of said conveyors, means for maintaining said cane spacing means at selected positions away from said one side wall for maintaining the lowermost layers of cane out of engagement with the inner runs of the conveyors.

3. A sugar cane planter comprising a wheeled vehicle having a bed thereon including side walls and a bottom for carrying cane stalks longitudinally therein, elevating means in said bed for lifting cane stalks over the top of at least one side wall, said elevating means including at least two endless conveyors extending from the bottom to the top of said one side wall and being disposed at longitudinally spaced intervals along said one side wall, said conveyors each having at least one inner run thereof disposed within said bed adjacent said one side wall, cane engaging fingers on said conveyors, means disposed along said one side wall within said bed for selectively spacing cane from the inner runs of the conveyors, said cane spacing means being swingably attached to said one side wall adjacent the upper end thereof and extending toward the bottom of the bed, for inward swinging movement into the bed beyond the inner runs of said conveyors, means for maintaining said cane spacing means at selected positions away from said one side wall for maintaining the lowermost layers of cane out of engagement with the inner runs of the conveyors, said cane spacing means comprising rub boards connected to one another for movement as a unit, the bottom of said bed having slots therethrough through which the lower ends of said rub boards extend, said swinging means being attached to the lower end of one of said spacing means.

4. A sugar cane planter comprising a wheeled vehicle having a bed thereon including side walls and a bottom for carrying cane stalks longitudinally therein, elevating means in said bed for lifting cane stalks over the top of at least one side wall, said elevating means including at least two endless conveyors extending from the bottom to the top of said one side wall and being disposed at longitudinally spaced intervals along said one side wall, said conveyors each having at least one inner run thereof disposed within said bed adjacent said one side wall, cane engaging fingers on said conveyors, means disposed along said one side wall within said bed for selectively spacing cane from the inner runs of the conveyors, said cane spacing means being swingably attached to said one side wall adjacent the upper end thereof and extending toward the bottom of the bed, for inward swinging movement into the bed beyond the inner runs of said conveyors, means for maintaining said cane spacing means at selected positions away from said one side wall for maintaining the lowermost layers of cane out of engagement with the inner runs of the conveyors, a transfer table including downwardly moving conveyor means on said vehicle and depending exteriorly of said one side wall from the upper edge thereof for receiving cane stalks from said elevating means and depositing them in a furrow.

References Cited in the file of this patent
UNITED STATES PATENTS

| | | |
|---|---|---|
| 275,089 | Sorensen | Apr. 3, 1883 |
| 1,005,435 | Kitchen | Oct. 10, 1911 |
| 1,726,139 | Blasco et al. | Aug. 27, 1929 |
| 1,755,720 | Winkler et al. | Apr. 22, 1930 |
| 2,510,411 | Montague | June 6, 1950 |